United States Patent [19]

Chen

[11] Patent Number: 5,619,896
[45] Date of Patent: Apr. 15, 1997

[54] BASE OF A SAWING MACHINE

[76] Inventor: Ruey Z. Chen, No. 261. Jen Hwa Road, Tali, City, Taichung, Taiwan

[21] Appl. No.: 495,320

[22] Filed: Jun. 27, 1995

[51] Int. Cl.⁶ .................................................. B27B 5/29
[52] U.S. Cl. ...................... 83/477.2; 144/286.1; 83/701
[58] Field of Search .................................. 248/314, 37.3, 248/37.6, 111, 113; 144/286.1, 286.5, 286 R, 286 A, 287; 83/477.2, 471, 701

[56] References Cited

U.S. PATENT DOCUMENTS

| | | | |
|---|---|---|---|
| 3,812,976 | 5/1974 | Rempel | 248/314 X |
| 4,239,195 | 12/1980 | Oltman et al. | 144/286.1 X |
| 4,248,115 | 2/1981 | Brodbeck et al. | 144/287 X |
| 4,350,193 | 9/1982 | McCambridge et al. | 83/477.2 X |
| 4,408,642 | 10/1983 | Jeruzal et al. | 144/286.5 X |
| 4,733,703 | 3/1988 | Cimino | 144/286.1 X |
| 4,887,653 | 12/1989 | Thomas | 144/287 X |
| 5,174,349 | 12/1992 | Svetlik et al. | 83/477.2 X |
| 5,224,531 | 7/1993 | Blohm | 144/286.5 X |

*Primary Examiner*—Rinaldi I. Rada
*Assistant Examiner*—Boyer Ashley
*Attorney, Agent, or Firm*—Morton J. Rosenberg; David I. Klein

[57] ABSTRACT

A base of a sawing machine is provided which includes a base portion, and a bench portion disposed on the base portion. A drive device may be disposed on an under side of the of the bench portion, with a saw disk extending through an aperture in the bench portion and drivingly coupled to the drive device. The base portion is made of plastic material and has a board disposed to a side wall thereof. A passage is defined between the side wall and the board for receiving a gauge device therein and the board is formed with a pocket to receive tools therein.

1 Claim, 3 Drawing Sheets

BASE OF A SAWING MACHINE

BACKGROUND OF THE INVENTION

1. Field of Invention

The present invention relates to a base of a sawing machine and more particularly, to a base having a board extending laterally from a side wall of the base, the board having a passage defined between the board and the side wall and a pocket disposed to the board so as to receive tools etc. therein.

2. Related Prior Art

A conventional sawing machine includes a base on which a bench is disposed, a saw disk, a drive means disposed to an under side of the bench and a gauge device disposed to an upper side of the bench, when operating the saw machine, some tools, such as spanners, rulers, may be used to lock the saw disk and to scale the products, generally, operators put the tools or elements on the bench for a convenience of accessing thereto, however, such a habit of randomly putting tools or elements on the bench could be a traverse to the normal work of the operators. In fact, operators do have a tool box to receive their tools but that is not convenient for the operators to access to.

The present invention intends to provide a base of a saw machine, which is made of plastic and has receiving means to conveniently receive tools therein so as to mitigate and/or obviate the above-mentioned problems.

SUMMARY OF THE INVENTION

The present invention provides a sawing machine, the base is made of plastic material and has a board disposed to a side wall thereof, a passage is defined between the side wall and the board for receiving a gauge device of the sawing machine therein and a pocket is disposed to the board so as to receive tools therein.

It is an object of the present invention to provide a base of a sawing machine wherein the base has a board disposed thereto and the board has various of receiving means for receiving tools or elements of the sawing machine therein.

It is another object of the present invention to provide a plastic material made base of a sawing machine so as to absorb noise of the sawing machine.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
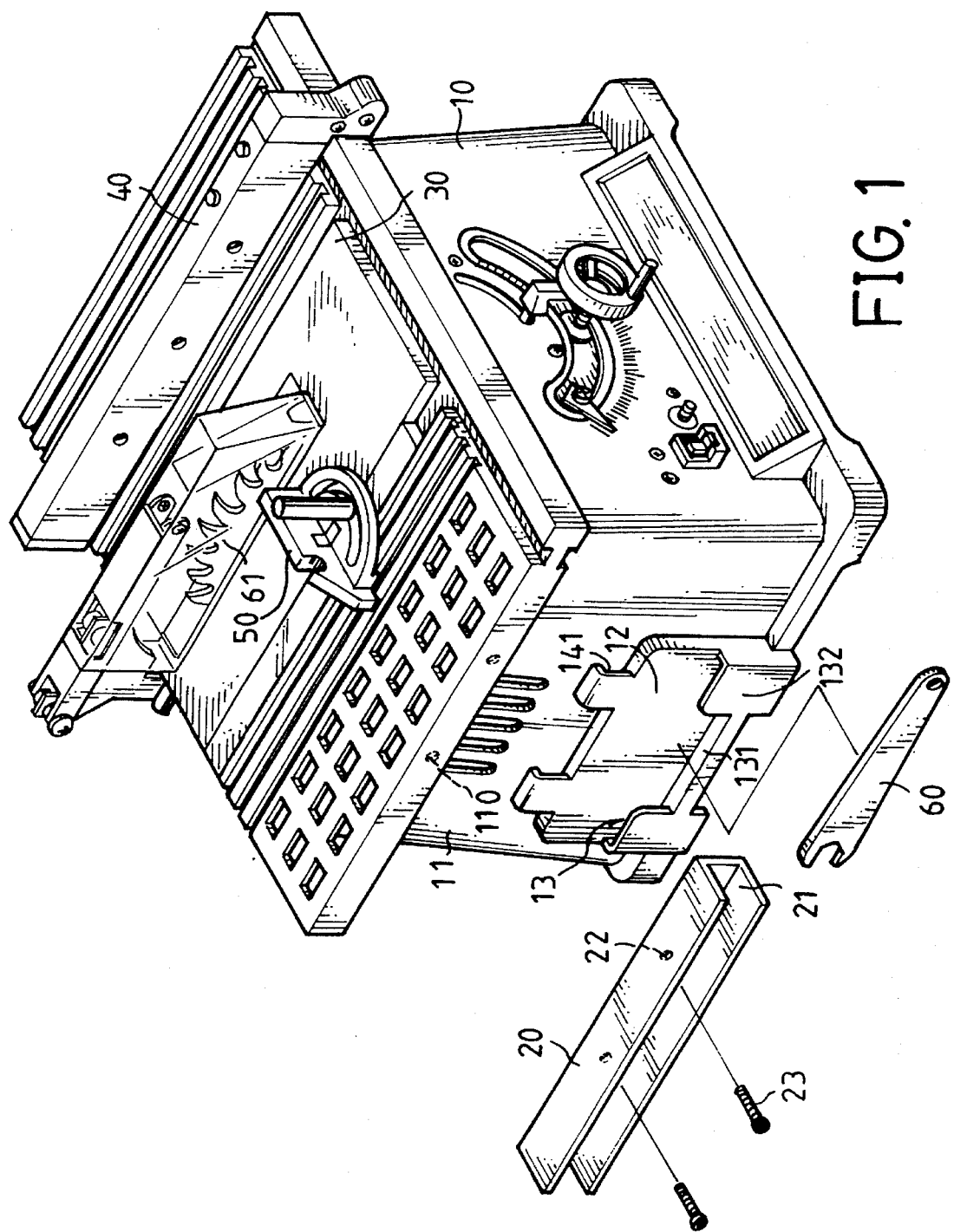
FIG. 1 is a exploded view of a base of the sawing machine in accordance with the present invention, a U-shaped frame and a tool.

Referring to the drawings and initially to FIG. 1, the sawing machine comprises a base 10, a bench 30 disposed on the base 10, a saw disk 61 rotatably disposed through an aperture in the bench 30, a drive means (not shown) disposed on an under side of the bench 30, a gauge means 50 disposed on the bench 30 beside the saw disk 61 and a guide means 40 disposed on the bench 30 beside the saw disk 61 opposite to the gauge means 50. The base 10 is made of plastic material and has a board 12 disposed to a side wall 11 thereof, the board 12 has two inverted L-shaped arms 14 connected between the board 12 and the side wall 11 of the base 10 so as to define a passage 141 between the side wall 11 and the two arms 14 of the board 12. A pocket 13 which is defined by a bottom 131 and a skirt portion 132 is integrally disposed to the board 12.

A U-shaped frame 20 is fixedly disposed to the side wall 11, the U-shaped frame 20 having a bottom 21 in which a plurality of holes 22 are defined and the side wall 11 of the base 10 having a plurality of threaded recesses 110 defined therein for bolts 23 extending through the holes 22 of the frame 20 and threadedly engaged to the threaded recesses 110.

Figure 2:
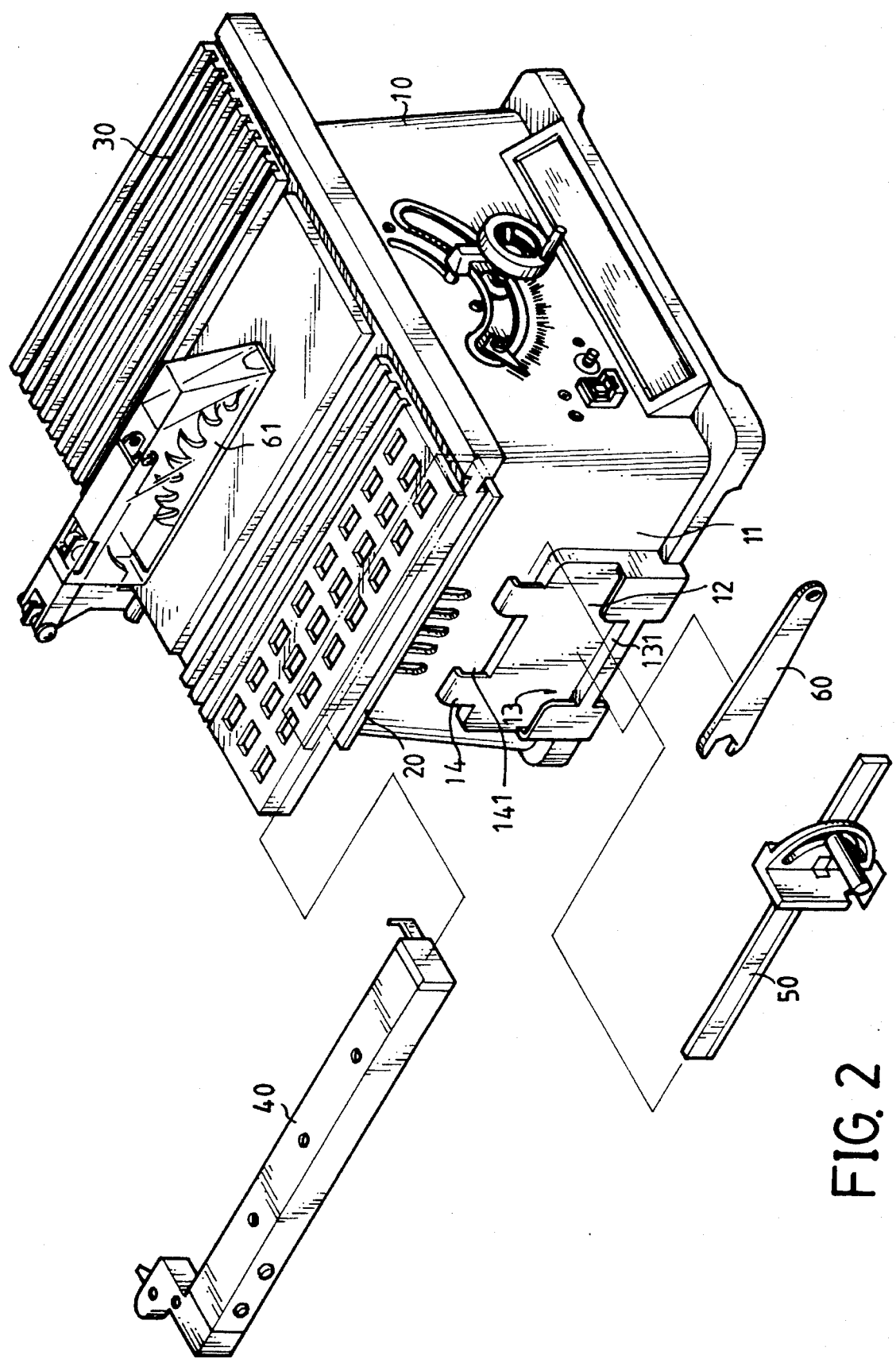
FIG. 2 is an exploded view of the sawing machine with the base in accordance with the present invention, a guide element, a gauge device and a tool.
Figure 3:
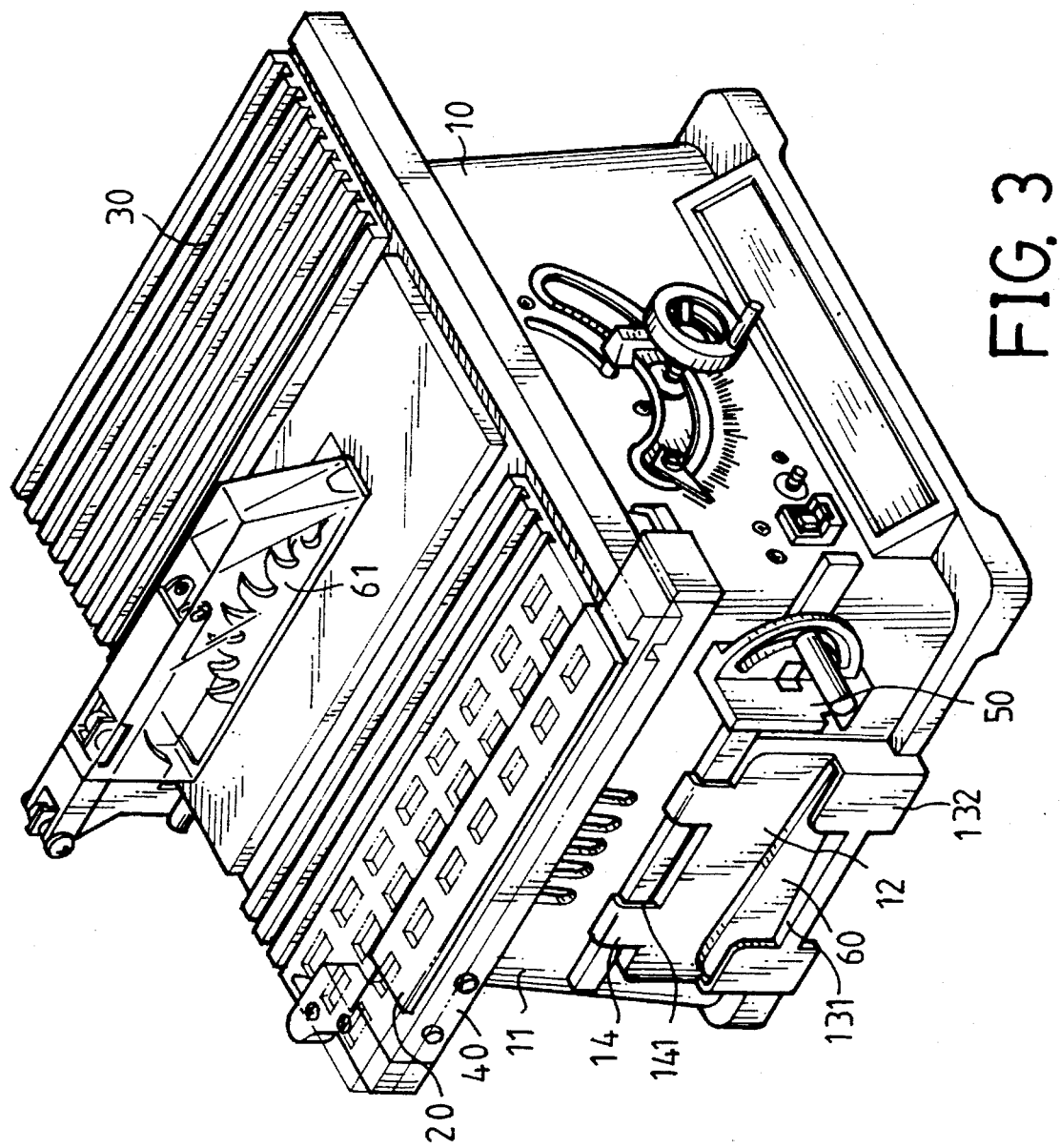
FIG. 3 is a perspective view of the sawing machine with the base in accordance with the present invention in which the elements shown in FIG. 2 are received.

Referring now to FIGS. 2 and 3, when utilizing the base 10, a tool such as a spanner 60 is received in the pocket 13, the gauge means 50 is disengaged from the bench 30 to be inserted in the passage 141 and the guide means 40 can be securely fitted to the frame 20.

Accordingly, the present invention provides a base 10 made of plastic material which can absorbs noise of the sawing machine and has various of receiving means to be used to receive tools and elements of the sawing machine, therefore, operators advantageously access the tools and elements needed and maintain a clean surface of the bench 30.

Although the invention has been explained in relation to its preferred embodiment, it is to be understood that many other possible modifications and variations can be made without departing from the spirit and scope of the invention as hereinafter claimed.

I claim:

1. A base for a sawing machine, comprising:

a pedestal base formed of a plastic material and having a pair of opposing side walls extending in a longitudinal direction from a lower end thereof to an upper end of said pedestal base;

a bench portion disposed on said upper end of said pedestal base, said bench portion having an aperture formed therethrough for extension of a saw blade therethrough, wherein the saw blade is driven by means disposed on an underside of said bench portion;

a first gauge releasably coupled to said bench portion adjacent a first side of said aperture;

a second gauge releasably coupled to said bench portion adjacent an opposing second side of said aperture;

a U-shaped frame member fixedly coupled to one of said side walls adjacent said upper end of said pedestal base and having an open channel extending in a direction transverse to said longitudinal direction for receiving and storing said first gauge therein; and, a board member coupled to said one side wall adjacent said lower end of said pedestal base, said board member having a pair of spaced inverted L-shaped arms extending from an upper edge of said board member to form a passage extending in said transverse direction for receiving and storing said second gauge therein, said board member having a bottom portion extending outwardly therefrom and an integrally formed skirt encompassing said bottom to define a pocket for receiving and storing tools therein.

* * * * *